United States Patent
Hooker et al.

(10) Patent No.: US 9,826,370 B2
(45) Date of Patent: Nov. 21, 2017

(54) LOCATION IDENTIFIERS IN MOBILE MESSAGING

(71) Applicant: T-Mobile USA, Inc., Bellevue, WA (US)

(72) Inventors: William Michael Hooker, Seattle, WA (US); Shelby Seward, Bellevue, WA (US); Shujaur Mufti, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 112 days.

(21) Appl. No.: 14/678,413

(22) Filed: Apr. 3, 2015

(65) Prior Publication Data

US 2016/0105780 A1 Apr. 14, 2016

Related U.S. Application Data

(60) Provisional application No. 62/062,590, filed on Oct. 10, 2014.

(51) Int. Cl.
*H04W 4/00* (2009.01)
*H04W 4/12* (2009.01)
(Continued)

(52) U.S. Cl.
CPC ........... *H04W 4/12* (2013.01); *H04L 65/1006* (2013.01); *H04L 65/1016* (2013.01);
(Continued)

(58) Field of Classification Search
CPC ....... H04W 4/12; H04W 4/02; H04W 64/003; H04W 48/16; H04W 80/04; H04W 84/12;
(Continued)

(56) References Cited

U.S. PATENT DOCUMENTS

| 2008/0268809 | A1* | 10/2008 | Busin | H04W 4/02 |
| | | | | 455/404.2 |
| 2009/0298458 | A1* | 12/2009 | Bakker | H04M 3/42348 |
| | | | | 455/404.1 |

(Continued)

OTHER PUBLICATIONS

PCT Search Report and Written Opinion dated Jan. 19, 2016 for PCT Application No. PCT/US15/54765, 11 pages.

*Primary Examiner* — Abdelnabi O Musa
(74) *Attorney, Agent, or Firm* — Lee & Hayes, PLLC

(57) ABSTRACT

A communication device may transmit messages to an Internet Protocol Multimedia Subsystem (IMS) network through an untrusted non-3GPP radio access network (RAN). A process to be implemented on a communication device may include generating a message having a location identifier (ID) that is indicative of a current location of the communication device, and transmitting the message, through an untrusted non-3GPP RAN, to a node within the IMS network. A process to be implemented on one or more nodes of the IMS network may include receiving, from a communication device and via an untrusted non-3GPP RAN, a message having a location ID, and in response to receiving the message, estimating a current location of the communication device based at least in part on the location ID.

18 Claims, 8 Drawing Sheets

(51) Int. Cl.
  *H04L 29/06* (2006.01)
  *H04W 4/02* (2009.01)
  *H04W 64/00* (2009.01)
  H04W 48/16 (2009.01)
  H04W 80/04 (2009.01)
  H04W 84/12 (2009.01)

(52) U.S. Cl.
  CPC ............ *H04L 65/1069* (2013.01); *H04W 4/02* (2013.01); *H04W 64/003* (2013.01); *H04W 48/16* (2013.01); *H04W 80/04* (2013.01); *H04W 84/12* (2013.01)

(58) Field of Classification Search
  CPC ............. H04L 65/1006; H04L 65/1016; H04L 65/1069
  See application file for complete search history.

(56) References Cited

U.S. PATENT DOCUMENTS

| | | |
|---|---|---|
| 2010/0113063 A1 | 5/2010 | Han et al. |
| 2010/0215001 A1 | 8/2010 | Russell et al. |
| 2011/0026440 A1* | 2/2011 | Dunn .................. H04M 3/5116 370/259 |
| 2011/0035284 A1 | 2/2011 | Moshfeghi |
| 2011/0299462 A1 | 12/2011 | Imbimbo et al. |
| 2012/0039312 A1* | 2/2012 | Narkar ................... H04W 8/00 370/338 |
| 2012/0307813 A1* | 12/2012 | Alriksson ........... H04L 65/1016 370/338 |
| 2013/0121292 A1 | 5/2013 | Tan et al. |

* cited by examiner

LOCATION IDENTIFIERS IN MOBILE MESSAGING

RELATED APPLICATIONS

This U.S. patent application claims priority to provisional U.S. patent application No. 62/062,590, entitled "P-LANI and PIDF-LO," and filed on Oct. 10, 2014, the entirety of which is incorporated herein by reference.

BACKGROUND

Internet Protocol Multimedia Subsystem (IMS) is an architectural framework for delivering Internet Protocol (IP) multimedia to mobile devices (e.g., smart phones, tablets, etc.) that are associated with users of the IMS network. An IMS core network (sometimes referred to as the "IMS core", or the "Core Network (CN)") permits wireless and wireline devices to access IP multimedia, messaging, and voice applications and services.

The IMS core is agnostic to the access technology that is used to connect mobile devices (commonly referred to as "user equipment (UE)") to the IMS core network. In this manner, a user's mobile device can connect to the IMS network via any suitable radio access network (RAN) that is available to the mobile device. For example, a mobile device can connect to the IMS core via a $3^{rd}$ Generation Partnership Project (3GPP) RAN, such a GSM/EDGE RAN (GERAN), a Universal Terrestrial RAN (UTRAN), or an evolved UTRAN (E-UTRAN). Accessing the IMS core through these types of 3GPP RANs typically involves communicating with the IMS core network through a cell site (cell tower). Alternatively, mobile devices can connect to the IMS core via a "non-3GPP" RAN, such as a Wi-Fi™ RAN, or another type of wireless local area network (WLAN) that is based on the Institute of Electrical and Electronics Engineers' (IEEE) 802.11 standards. Accessing the IMS core through a Wi-Fi access network typically involves communicating with the IMS core through a Wi-Fi Access Point (AP). Providing access to the IMS core through non-3GPP RANs has opened the door to recent advancements in IMS-based services, such as the introduction of Wi-Fi calling, which allows users to initiate and receive calls over an available Wi-Fi AP.

With respect to non-3GPP RANs, the 3GPP standard defines two types of access: trusted and untrusted. In general, a trusted RAN is a RAN that is operated by the IMS core operator, or by another trusted party to the IMS core operator (e.g., a contractor, an affiliate, an industry partner, etc.). By contrast, an untrusted RAN is a RAN that connects UE to the IMS core through a Wi-Fi AP and a public network, such as the Internet, which the IMS operator has no control over. For example, a mobile device may connect to the IMS core network through public hotspots, a subscriber's home Wi-Fi, corporate Wi-Fi, and so on.

When users access IMS-based services over an untrusted RAN, a wireless carrier is unable to ascertain the user's location. This is primarily due to the infrastructure of untrusted RANs. That is, wireless carriers (or cellular network operators) don't own the backhaul for untrusted RANs, and as a consequence, the transmissions from mobile devices are transmitted over an open and public network (e.g., the Internet) before the transmissions are received at the carrier-owned IMS core network. In the absence of location information for the untrusted RAN equipment (e.g., location of Wi-Fi APs), the carrier cannot ascertain the user's location. Considering that a transient user may carry his/her mobile device to any location/Wi-Fi AP where the user has security credentials to access an untrusted RAN, the user can obtain access to IMS-based services while the carrier does not know the subscriber's location.

There are many reasons why the carrier may need to know the current location of a user/subscriber. For example, federal regulations specify that a subscriber is to have a reasonable expectation that he/she can dial 911 and be routed to the correct (i.e., nearest) public safety answering point. There are also non-emergency short codes (e.g., poison control, 811—call before you dig, 311 city non-emergency, text to 911, etc.) that are routed to an appropriate long number based on location. Furthermore, the types of restrictions applied by carriers at the time of IMS service registration may vary by location of the subscriber. Without knowledge of the subscriber's current location, none of this is possible. Another example relates to billing subscribers at appropriate rates. That is, billing rates associated with use of IMS-based services (e.g., telephony services) can vary by the location of the subscriber when the services are used. Without knowledge of the subscriber's current location, billing at different rates based on location is not possible.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
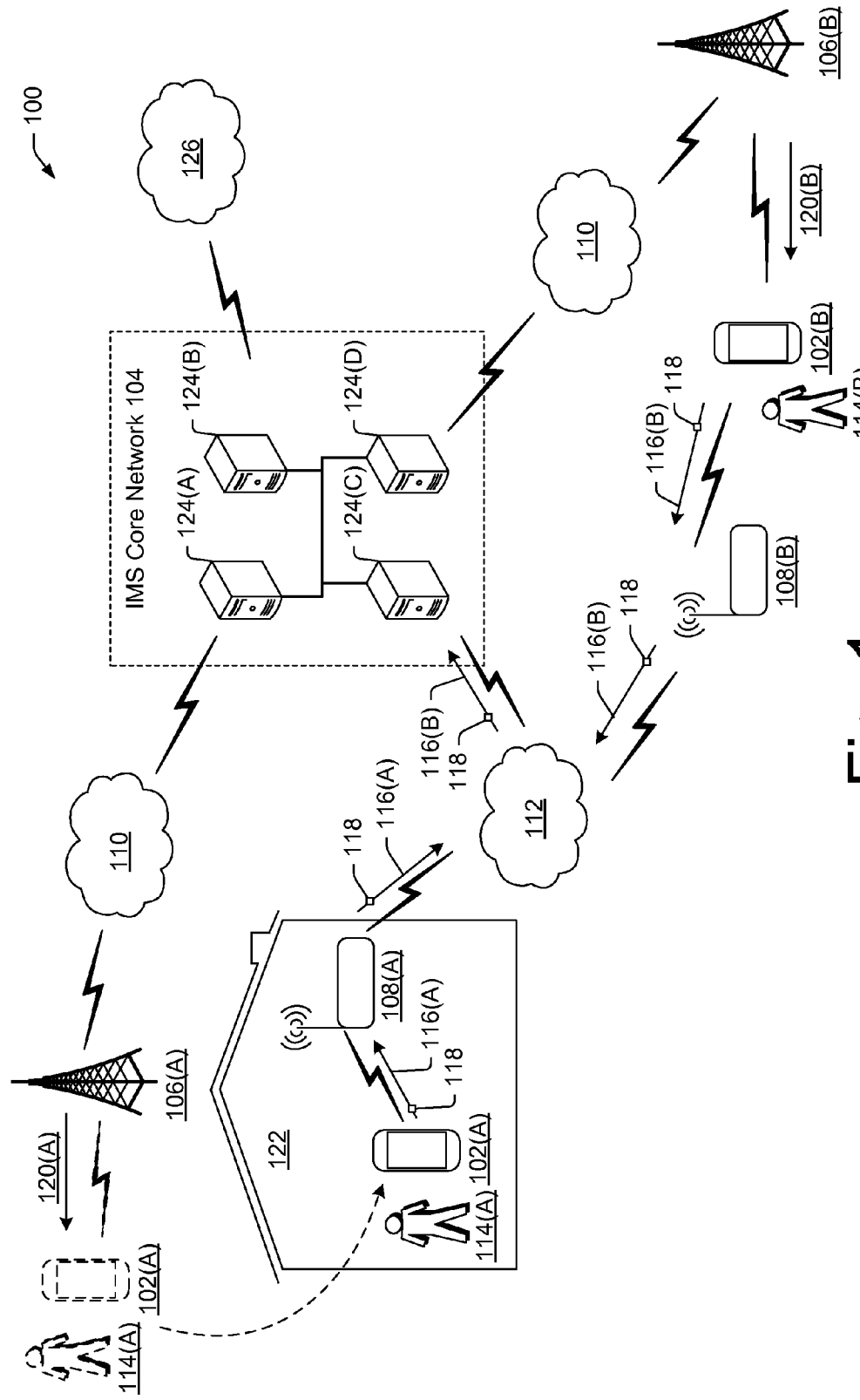
FIG. 1 illustrates an example IMS environment that facilitates transmission of location identifiers (IDs) in messages sent from mobile devices to the IMS core network.

Described herein are techniques and systems for including one or more location identifiers (IDs) in a message transmitted from a communication device to an IMS core network, the location ID(s) being indicative of a current location of a communication device that transmits the message.

Also described herein are techniques and systems for processing a message that includes one or more location IDs to estimate a current location of a communication device that transmitted the message.

A mobile communication device, by its very nature, is subject to being moved (e.g., carried by a user) to any location. If wireless connectivity is available at a given location, the communication device can wirelessly transmit/receive data over a network that is available to the communication device. When a user has subscribed to services that are provided by a wireless carrier (e.g., multimedia telephony services), the user may access those services from the carrier's IMS network via an available RAN that provides the aforementioned wireless connectivity to the communication device. The communication device may include an IMS client configured to, among other things, generate and send messages to the IMS via the RAN, the messages facilitating access to the IMS-based services on the user's communication device.

The IMS client, upon generating a message, may include one or more location IDs within the message that are indicative of the current location of the communication device. The IMS client may use various techniques, as described herein, for obtaining the location ID(s) that are ultimately included in the message. The inclusion of the location ID in the message allows a component of the IMS core network to estimate the current location of the communication device (and hence the location of the associated user/subscriber) in response to receiving and processing the message in the IMS core when the message is forwarded from an untrusted RAN, such as a Wi-Fi RAN. In this manner, a current location of the communication device can be estimated by a component of the IMS core using the location ID in the message transmitted from the communication device, even though the untrusted RAN infrastructure is unknown from the perspective of the IMS operator.

Although the techniques and systems disclosed herein are predominantly described with respect to non-3GPP RANs based on Wi-Fi, this disclosure is not limited to implementations using Wi-Fi technology or Wi-Fi calling or telephony services. That is, the messaging techniques and systems described herein may be implemented with any type of untrusted RAN, such as untrusted RANs implemented with other WLAN technologies, regardless of whether they are based on IEEE 802.11 standards. Moreover, although messages are predominantly discussed with respect to Session Initiation Protocol (SIP) request methods (or SIP requests), it is to be appreciated that the messages of the embodiments described herein may be any type of message.

In some embodiments, a process to be implemented on a communication device includes generating a message having a location ID that is indicative of a current location of the communication device, and transmitting the message, through an untrusted non-3GPP RAN, to a node within an Internet Protocol Multimedia Subsystem (IMS) network.

In some embodiments, a process to be implemented on one or more components or nodes of an IMS network includes receiving, from a communication device and via an untrusted non-3GPP RAN, a message having a location ID, and in response to receiving the message, estimating a current location of the communication device based at least in part on the location ID.

Also disclosed herein are systems comprising one or more processors and one or more memories, as well as non-transitory computer-readable media storing computer-executable instructions that, when executed, by one or more processors perform various acts and/or processes disclosed herein.

EXAMPLE ENVIRONMENT

FIG. 1 illustrates an example IMS environment 100 for implementing a messaging scheme for the transmission of location identifiers (IDs) in a messages sent from mobile devices 102 to the IMS core network 104. As shown in FIG. 1, mobile devices 102, shown as the mobile device 102(A) and the mobile device 102(B), are configured to communicate with, and connect to, the IMS core network 104 through a trusted radio access network (RAN) 106 and/or an untrusted RAN 108.

The mobile devices 102 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the devices 102 as being "mobile," (i.e., configured to be carried and moved around) it is to be appreciated that the mobile devices 102 may represent various types of communication devices that are generally stationary as well, such as televisions, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein. Furthermore, the mobile devices 102, as well as the trusted and untrusted RANs 106 and 108, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

Both the trusted RAN 106 and the untrusted RAN 108 provide a physical wireless link between the mobile devices 102 and the IMS core network 104, and each mobile device 102 may be configured to use one or both types of RANs 106 and/or 108. The trusted RAN 106 is shown in FIG. 1, by way of example, as a cell site that is owned, leased, and/or operated by an operator of the IMS core 104, or another trusted party that is associated with the operator of the IMS core 104 (e.g., a contractor, an affiliate, an industry partner, etc.). It is to be appreciated that other components (not shown) in addition to a cell site make up the trusted RAN 106. The trusted RAN 106 may be connected to and communicate with the IMS core 104 via a private network 110 that is not open to the public (e.g., a dedicated backhaul).

The private network 110 is representative of many different types of private networks (e.g., a mobile telephone network), and the private network 110 may be wired, wireless, or a combination thereof. The private network 110 may include intermediary components that may include, without limitation, a Gateway GPRS Support Node (GGSN), Serving GPRS Support Node (SGSN), or similar components that facilitate mobility management, session management, and transport for IP packet services within the trusted RAN 106.

The untrusted RAN 108 is shown in FIG. 1, by way of example, as a Wi-Fi access point (AP) that connects to the IMS core 104 over a public network 112, such as the Internet, or any other type of wired and/or wireless network that is generally open to the public. It is to be appreciated that other components (not shown) in addition to a Wi-Fi AP make up the untrusted RAN 108.

The IMS core network 104 may be maintained and/or operated by one or more service providers, such as one or more wireless carriers, that provide mobile IMS-based services to subscribers 114 (sometimes called "users 114") who are associated with the mobile devices 102. The subscribers 114 may utilize their mobile devices 102 to communicate with other subscribers 114 and devices. Additionally, or alternatively, the subscribers 114 may utilize their mobile devices 102 to receive, provide, or otherwise interact with various different IMS-based services by accessing the IMS core 104. For example, a service provider may offer multimedia telephony services over Wi-Fi (Wi-Fi calling services) that allow the subscribers 114 to call or message other subscribers 114 when they are in range of a Wi-Fi access point (AP) that is part of a RAN (either the trusted RAN 106 or the untrusted RAN 108) for accessing the IMS core network 104. In this manner, a service provider may offer any type of IMS-based services in addition to multimedia telephony services, such as services that include, without limitation, emergency services (e.g., E911), gaming services, instant messaging services, presence services, video conferencing services, social networking and sharing services, location-based services, push-to-talk services, and so on.

The mobile devices 102 may be configured to register for, and thereafter access and utilize, one or more of the IMS-based services accessed via the IMS core 104. Accordingly, the mobile devices 102 may be configured to transmit messages to the IMS core network 104 as part of an IMS registration process and/or as part of accessing and using the IMS-based services. FIG. 1 shows messages 116 being sent from the mobile devices 102 to the IMS core 104 through the untrusted RAN 108. The messages 116 may comprise any suitable message, such as a request to register for an IMS-based service, a request to establish, modify, or terminate a multimedia session (e.g., a multimedia telephony call), and so on.

In some embodiments, the messages 116 comprise Session Initiation Protocol (SIP) request methods (sometimes called "SIP requests"). SIP is a signaling protocol that can be used to establish, modify, and terminate multimedia sessions over packet networks, and to authenticate access to IMS-based services. SIP has been standardized by the Internet Engineering Task Force (IETF). A message 116 in the form of a SIP request is a message that is sent from the mobile device 102 to the IMS core 104 using SIP protocol. A SIP response is a message that is sent from the IMS core 104 to the mobile device 102 using SIP protocol. In an illustrative example with reference to FIG. 1, the message 116(B) may comprise a SIP REGISTER message (a type of SIP request) that is sent during an IMS registration process using a "REGISTER" method. Once IMS registration is successfully completed, the mobile device 102 may establish multimedia sessions (e.g., a Wi-Fi calling session) with another party or multiple parties via the IMS core 104. During a multimedia session, other types of SIP request methods (e.g., SIP INVITE or MESSAGE messages) may be transmitted as SIP requests from the mobile device 102 to the IMS core 104. The messages 116 may represent any of the above mentioned types of messages.

Each message 116 may comprise at least a message header and a message body for carrying various types of information, identifiers (IDs), and/or data. When the message 116 is generated by the mobile device 102, a client application of the mobile device 102 may insert a location ID 118 within the message 116. The location ID 118 is generally a piece of information, an ID, and/or data that is indicative of the current location of the mobile device 102. In some embodiments, the location ID 118 specifies an approximate current location of the mobile device 108. In other embodiments, the location ID 118 does not specify the approximate current location of the mobile device 102, but the location ID 118 may still be used to determine the approximate current location of the mobile device 102, and hence, the location ID 118 is indicative of the current location of the mobile device 102. As noted above, because the operator of the IMS core network 104 does not own the backhaul associated with the untrusted RAN 108, the operator, without such a location ID 118, would be unable to ascertain the current location of the mobile device 102 (and hence the current location of the user 114 associated with the mobile device 102).

In general, the location ID 118 conveys something that an IMS operator knows about location. This means that, even though the IMS operator may not know where a Wi-Fi AP of the untrusted RAN 108 is located, the IMS operator may use the location ID 118 to estimate the current location of the mobile device 102. As such, the location ID 118 may comprise any suitable information, ID, and/or data that can be used by the IMS core network 104 to determine the current location of the mobile device 102.

In an illustrative example, the location ID 118 may comprise data captured from a nearest, or in-range, cell site/tower within the trusted RAN 106(A). For example, FIG. 1 illustrates that the mobile device 102(A) is configured to receive a cell capture 120(A) when the mobile device 102(A) is able to communicate with a cell site of the trusted RAN 106(A). The cell capture 120(A) may comprise a message carrying data associated with the cell site in the trusted RAN 106(A). For example, the cell capture 120(A) may contain a cell ID (CID) that specifies, or can be used to obtain, the location of a cell site within the trusted RAN 106(A) that is closest to the mobile device 102 at the time the cell capture 120(A) is obtained. In some embodiments, the cell capture 120(A) may include received signal strength data, time of flight (ToF) data, and other suitable metrics that may be indicative of a distance of the mobile device 102(A) from the cell site of the trusted RAN 106(A) at the time the cell capture 120(A) is obtained by the mobile device 102(A). FIG. 1 also illustrates that the mobile device 102(B) is configured to obtain a cell capture 120(B) from a nearest, or in-range, cell site/tower within the trusted RAN 106(B).

Accordingly, the message 116 sent from the mobile device 102 to the IMS core 104 may include a location ID 118 that is, or is derived from, the cell capture 120 (e.g., a CID of the nearest cell site). The location ID 118 may be included anywhere in the message 116 (e.g., the header and/or body of the message 116). When the message 116 comprises a SIP request, the location ID 118 pertaining to data from a cell capture 120 may be included in a private header (P-header) of a SIP request. Such a P-header is referred to herein as a "P-Last Access Network Information (P-LANI)" header, because it represents the last known cell (LKC) that was visible to the mobile device 102 at the time the message 116 is sent. Examples pertaining to the P-LANI header will be described in more detail below with reference to the following figures. It is to be appreciated that "P-LANI" is merely one example name for such a P-header, and that other names can be used for this P-header without changing the basic characteristics of the systems and techniques described herein. The location ID 118, or an additional location ID, may be included in the body of the message as "presence" information. This embodiment will be described in more detail below with reference to the following figures.

In some scenarios, the cell capture 120 may be obtained at approximately the same time that the message 116 is transmitted by the mobile device 102. In other scenarios, the cell capture 120 may be obtained at some time before the message 116 is transmitted by the mobile device 102. In the latter scenario, the cell capture 120 data may be cached (or otherwise maintained in memory) by the mobile device 102 so that it may be later inserted within the message 116. FIG. 1 shows both of the aforementioned scenarios for illustrative purposes. In one scenario, the user 114(B) possesses the mobile device 102(B) while the mobile device 102(B) and the user 114(B) are within cellular coverage of the trusted RAN 106(B). In other words, the cellular radio of the mobile device 102(B) is able to communicate with a cell site of the trusted RAN 106(B), such as for sending/receiving transmissions to/from the IMS core 104 through the trusted RAN 106(B), and/or for obtaining the cell capture 120(B). In addition to being within cellular coverage of the trusted RAN 106(B), the mobile device 102(B) is shown as being within range of a Wi-Fi AP of the untrusted RAN 108(B). That is, a wireless communication interface of the mobile device 102(B) is able to communicate with the Wi-Fi AP of the untrusted RAN 108(B) while the cellular radio of the mobile device 102(B) is able to communicate with a cell site of the trusted RAN 106(B). Thus, the user 114(B) may desire to call another user, such as the user 114(A), over the IMS core network 104 using Wi-Fi calling, even though the user 114(B) is in cellular coverage. Accordingly, the mobile device 102(B) may obtain the cell capture 120(B) using a cellular radio of the mobile device 102(B), and at substantially the same time, the mobile device 102(B) may send a message 116(B), such as a SIP REGISTER method, to register for Wi-Fi calling. The message 116(B) may include the location ID 118 that is, or is derived from, data of the cell capture 120(B).

In another scenario, the user 114(A) may have carried his/her mobile device 102(A) into a building 122 from a location outside of the building 122. For illustrative purposes, the mobile device 102(A), once inside the building 122, is unable to communicate with the trusted RAN 106(A), which might be the case when the user 114(A) has carried the mobile device 102(A) into a basement of the building 122 where cellular reception is unavailable to the mobile device 102(A). Similar examples may involve scenarios where the user 114(A) carries his/her mobile device 102(A) to a location that is on the fringe of a carrier's commercial radio spectrum such that communication with the trusted RAN 106(A) is lost. In any case, the user 114(A) and the mobile device 102(A), despite being unable to communicate with the trusted RAN 106(A), may be within range of a Wi-Fi AP of the untrusted RAN 108(A). That is, the wireless communication interface of the mobile device 102(A) may be able to communicate with the Wi-Fi AP of the untrusted RAN 108(A), assuming the mobile device 102(A) or the user 114(A) has the credentials to do so, if necessary. In this scenario, the user 114(A) may want to initiate a call over Wi-Fi calling, and as a result, the mobile device 102(A) may generate a message 116(A) (e.g., a SIP REGISTER method) to be sent to the IMS core 104 through the untrusted RAN 108(A). The message 116(A) may include a location ID 118 that is, or is derived from, data of the cell capture 120(A) (e.g., the CID of a cell site/tower contained in the cell capture 120(A)). That is, at some earlier time, the mobile device 102(A) obtained the cell capture 120(A) from a nearest, or in-range, cell site/tower of the trusted RAN 106(A), and cached the data from the cell capture 120(A) in memory of the mobile device 102(A). The mobile device 102(A) may have obtained additional cell captures 120 prior to the cell capture 120(A) such that multiple cell captures are maintained in cache of the mobile device 102(A) by the time the mobile device 102(A) is inside the building 122. In this scenario, the last known (i.e., most recent) cell capture 120(A) is used for generating the message 116(A) having the location ID.

The IMS core network 104 may include multiple nodes 124 that are configured for various purposes, such as control and management of multimedia sessions of the IMS core network 104. FIG. 1 illustrates four nodes 124(A)-(D), but it any number of nodes 124 less than or greater than four may be utilized in the IMS core network 104. Individual ones of the nodes 124 may represent various Call Session Control Functions (CSCF) that provide SIP registrar and proxy functionality, such as a proxy CSCF (P-CSCF), an interrogating CSCF (I-CSCF), a serving CSCF (S-CSCF), an emergency CSCF (E-CSCF), and the like. Other ones of the nodes 124 may represent a security gateway (SEG), a session border controller (SBC), and/or a home subscriber server (HSS). The untrusted RAN 108 may be directly connected to a node 124 of the IMS core 104, or one or more of the nodes 124 (e.g., an SBC) may establish a secure IP tunnel for traffic coming from the untrusted RANs 108 to the IMS core 104. The node 124(C) may represent a P-CSCF, or a similar node 124, that receives the messages 116 from the mobile devices 102, and the P-CSCF may then forward the messages 116, or information therein, to other nodes 124 of the IMS core 104, as appropriate. One or more components (e.g., executable modules) may reside on one or more of the nodes 124 of the IMS core 104 and may be responsible for processing the incoming messages 116 to extract the location ID(s) 118 and other information included in the messages 116. The message processing by the nodes 124 of the IMS core 104 may involve parsing the header or the body of the message 116 to identify and extract the location ID 118 so that it may be utilized for various purposes.

Components of the IMS core 104 may, among other things, estimate the current location of a mobile device 102 associated with a received message 116, and various downstream operations may be performed with the estimated current location of the mobile device 102. Possible downstream operations include, without limitation, call routing (e.g., routing to the correct (i.e., nearest) public safety answering point for 911 calls, or to a correct receiver endpoint for other short codes (x11)), determining a billing rate for a multimedia telephony service, granting access to a multimedia telephony service, and/or forwarding the estimated location to an authorized third party (e.g., a family member of the user 114).

In some embodiments, the IMS core network 104 interfaces with a public switched telephone network (PSTN) 126. For example, calls may originate from a mobile device 102, be routed through the IMS core 104, and terminate at the PSTN 126.

Figure 2:
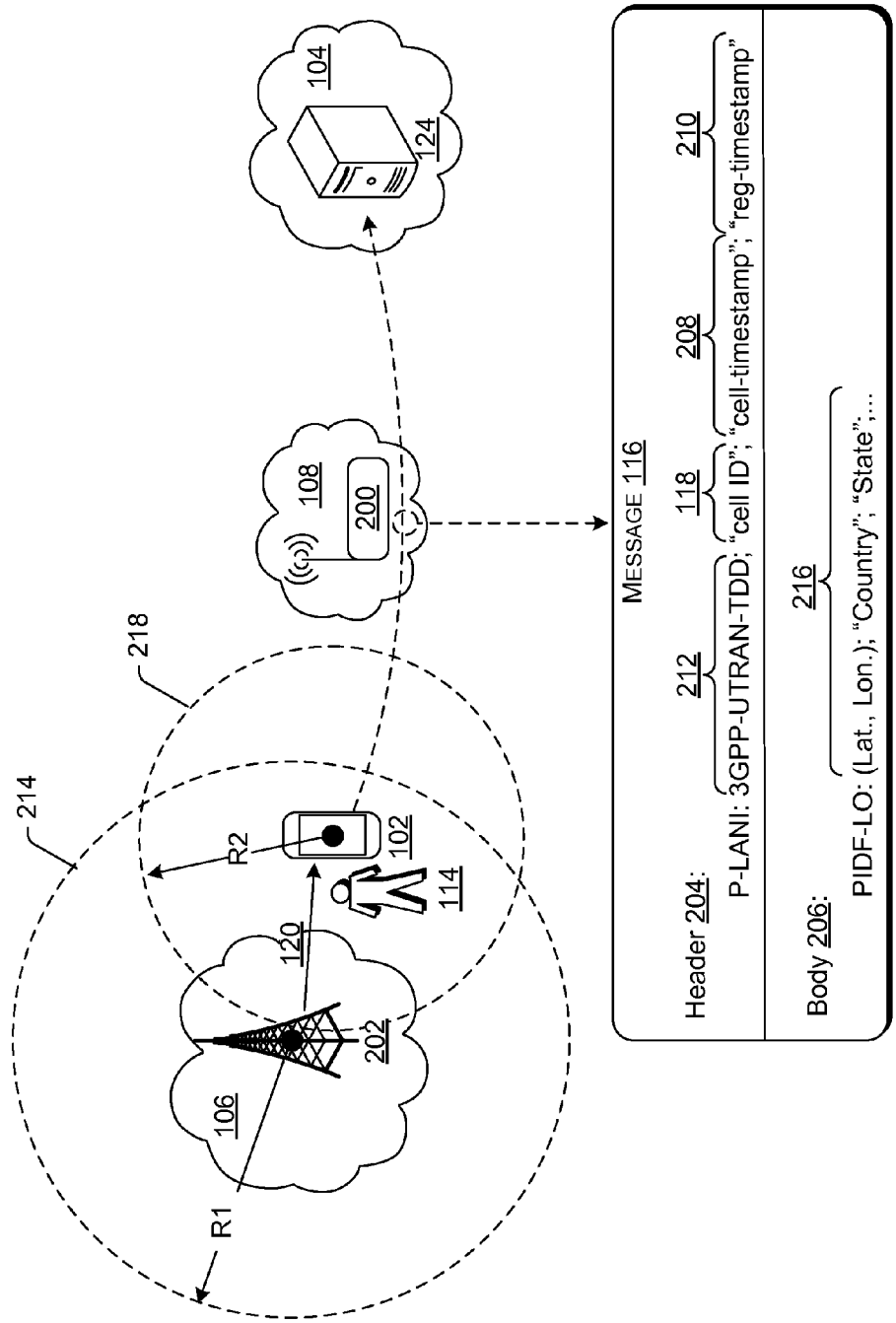
FIG. 2 illustrates a diagram of an example mobile messaging scheme for transmitting a location ID from a mobile device to a node of the IMS core network.

FIG. 2 illustrates a diagram of an example mobile messaging scheme for transmitting a message 116 from a mobile device 102 to a node 124 of the IMS core network 104, the message 116 having information allowing a component of the IMS core 104 to estimate the current location of the mobile device 102. In an illustrative scenario, the mobile device 102 may send the message 116 as part of an IMS registration process in an attempt to register for an IMS-based service, such as a multimedia telephony service. In IMS registration, there may be two registers, an unprotected register that is initially used to setup the authentication by initiating a challenge that, if met, authenticates the mobile device 102 to talk securely via a second, protected register. In some embodiments, the message 116 is part of a second, protected register for IMS registration. However, the message 116 can represent any other type of message, such as a message to setup or establish a call with another mobile device 102 of another subscriber 114.

As shown in FIG. 2, the message 116 is sent from the mobile device 102 to the IMS core network 104 through an untrusted RAN 108. The untrusted RAN 108 may include a Wi-Fi AP 200 that is in the vicinity (i.e., within wireless communication range) of the mobile device 102 such that the mobile device 102 can communicate with the IMS core 104 through the untrusted RAN 108.

The user 114 may move about an area while carrying his/her mobile device 102. As the mobile device 102 moves with the user 114, it may obtain, at multiple different times (e.g., periodically), cell captures of cell sites that are visible to (i.e., within cellular communication range of) the mobile device 102. For example, the mobile device 102 is shown as obtaining a cell capture 120 from a cell site 202, which is part of a trusted RAN 106. Thus, as it moves, the mobile device 102 may cache a list of cell captures 120, each including data (e.g., a CID) associated with a cell site, such as the cell site 202. In some embodiments, a cell-timestamp may be cached in association with the cell capture 120 to indicate a time when the cell capture 120 was obtained.

When the message 116 is sent from the mobile device 102 to the node 124 of the IMS core 104, a location ID, such as the location ID 118, may be included within the message 116 before transmission. FIG. 2 shows that the message 116 may include a header 204 and a body 206, each portion of the message 116 being configured to carry the location ID 118, and possibly additional location IDs. The header 204 may include a P-header (e.g., a P-LANI header) that comprises at least one location ID 118. The syntax for the P-LANI header may follow the 3GPP Test Specification (TS) 24.229 for 3GPP based access networks. In the example of FIG. 2, the location ID 118 is shown in the form of a CID of the cell cite 202, which may have been captured by the cell capture 120. The P-LANI header in the message header 204 may further include a first timestamp 208 (or "cell-timestamp" 208) to indicate the time that the cell capture 120 was obtained by the mobile device 102, and hence a time that the location ID 118 was obtained by the mobile device 102. The cell-timestamp 208 can be used to tell a component of the IMS core 104 how long ago the mobile device 102 saw the specific 3GPP trusted RAN 106 via the cell capture 120. The P-LANI header may further include a second timestamp 210 (or "reg-timestamp" 210) to indicate the time when the message 116 was transmitted from the mobile device 102.

In some instances, the two timestamps 208 and 210 may indicate the same time. This may be the case when the cell capture 120 was obtained substantially contemporaneously with the transmission of the message 116, and the difference between the two timestamps is substantially zero to indicate that the location ID 118 has an age of zero. The P-LANI header 204 may further include a commercial mobile radio service (CMRS) identifier 212 that indicates the type of trusted RAN 106 with which the cell site 202 is associated. FIG. 2 illustrates an example where the cell site 202 is part of a UTRAN that is trusted by the operator of the IMS core 104.

Although the header 204 is shown as including a P-LANI header and nothing else, it is to be appreciated that the header 204 may contain additional headers, and the P-LANI header may itself contain additional information, IDs, and/or data. For example, the header 204 may also include information regarding the type of RAN 106/108 through which the message 116 was sent (e.g., IEEE 802.11b), the media access control (MAC) address of the Wi-Fi AP 200, an identifier of the user 114, a mobile number associated with the mobile device 102, a mobile number of another device being called by the mobile device 102, the type of IMS-based service being accessed on the mobile device 102 (e.g., Wi-Fi calling, including voice or video calling, Short Message Service (SMS) text, etc.), authentication vectors for REGISTER methods, supported media (e.g., codecs), a country code (MCC), a carrier code (MNC), and so on.

Upon receipt of the message 116, the node 124 may parse the header 204 to extract the location ID 118 (e.g., the CID of the cell site 202) to determine the location of the cell site 202, which is generally known to the operator of the IMS core network 104. A component of the IMS 104 may then determine an estimated location of the mobile device 102 (and hence the location of the user 114 carrying the mobile device 102). The estimated location may be specified as a point location of the cell site 202 and a shape 214 surrounding the point location. In this case, the shape 214 comprises a circle having a radius, R1, but the shape 214 may comprise any polygonal form (e.g., square, triangular, star, etc.). The shape 214 around the point location of the cell site 202 may be used to convey the uncertainty of the point location corresponding to an actual location of the user 114. For example, the size of the shape 214 may convey a 68% uncertainty that the point location of the cell site 202 is where the mobile device 102 is actually located. That is, 68% of the time, the mobile device 102 that sent the message 116 will be located within the shape 214 with radius R1.

In other embodiments, the shape 214 may be used to account for an age of the location ID 118. For example, when the cell-timestamp 208 is different (i.e., earlier than) the reg-timestamp 210, the size of the shape 214 may account for the distance the user 114 is likely to have traveled in the time period between the cell-timestamp 208 and the reg-timestamp 210. Moreover, because the user 114 was most likely not located exactly at the point location of the cell site 202 at the time of obtaining the cell capture 120, the size of the shape 214 may further account for the uncertainty of the user being located at the cell site 202.

In some embodiments, the location ID 118 may include data regarding a distance of the mobile device 102 from the cell site 202 at the time the cell capture 120 was obtained. Any suitable technology (e.g., received signal strength, time-of-flight, etc.) may be used to gather distance data at the time the mobile device 102 obtains the cell capture 120.

In this scenario, the size of the shape 214 may account for this initial distance between the user 114 and the cell site 202 that was captured.

The message body 206 may also include a location ID 216. The location ID 216 may be an additional location ID to that of the location ID 118 in the header 204, or the location ID 216 may be included in the message 116 in lieu of providing the location ID 118 in the header 204. Thus, in some implementations a single location ID (e.g., the location ID 118) may be transmitted in the message 116, while in other implementations multiple location IDs or location objects can be transmitted in the message 116, which may comprise any number of various P-headers, presence information, and/or Multi-purpose Internet Mail Extensions (MIME) attachments, and the like.

The location ID 216 may be provided as "presence" information, such as in the form of a "Presence Information Data Format-Location Information Object (PIDF-LO)". The PIDF-LO portion of the message body 206 may be provided as extensible markup language (XML). In some embodiments, the location ID 216 in the PIDF-LO portion of the message body 206 represents an approximation, determined by the mobile device 102, of the current location of the mobile device 102 at the time the message 116 is transmitted, which is indicated by the reg-timestamp 210. The location ID 216 may be provided in any suitable format, such as geodetic location (e.g., latitude and longitude coordinates), civic location (e.g., country, state, city, street address, apartment/unit number, and so on), or a combination of both geodetic and civic information. In some embodiments, the amount of granularity provided by civic location may be limited to a certain level (e.g., nothing beyond, or more specific, than the country level), or user consent may be required to provide more granularity to the location information.

The location ID 216 in the PIDF-LO portion of the message body 206 may be derived from any suitable component available to the mobile device 102. In some instances, geodetic information of the location ID 216 may be received from a global positioning system (GPS) receiver of the mobile device 102 as a result of an application making a function call to the operating system of the mobile device 102. The civic information of the location ID 216 may be received by a client application executing on the mobile device 102. For instance, an application executing on the mobile device 102 may prompt the user 114 to enter his/her current location in order to access services provided by the application. In some embodiments, the location ID 216 may be provided by crowdsourcing technology, such as by a client application of the mobile device 102 gathering Wi-Fi signatures in its vicinity, and the like. In this sense, the location ID 216 may not be dependent on the cellular communication capabilities (e.g., the cellular radio) of the mobile device 102.

Although the body 206 of the message 116 is shown as including PIDF-LO presence information and nothing else, it is to be appreciated that the message body 206 may contain additional information, IDs, and/or data. For example, the message body 206 may also include information regarding a type of shape 218 that conveys the uncertainty that the location specified by the location ID 216 corresponds to the actual location of the mobile device 102. For example, information included in the message body 206 may indicate that the shape 218 is a circle, a square, a triangle, or some other suitable polygon. The message body 206 may also include the entity that provided the location ID 216, such as the mobile device 102, or a hardware or software component thereof, a person (e.g., the user 114), and the like.

Upon receipt of the message 116, the node 124 may also parse the message body 206 to extract the location ID 216 (e.g., the geodetic location specified therein) to determine the location of the mobile device 102. A component of the IMS 104 may then specify an estimated location of the mobile device 102 (and hence the location of the user 114 carrying the mobile device 102) as a point location of the mobile device 102 and the shape 218 surrounding the point location. In this case, the shape 218 comprises a circle having a radius, R2. Like the shape 214, the size of the shape 218 may convey an uncertainty metric (e.g., 68% uncertainty) that the point location of the mobile device 102 specified in the location ID 216 is where the mobile device 102 is actually located.

The location estimate(s) (i.e., the point location(s) and surrounding shapes 214 and/or 218) may be utilized in various ways for downstream operations. For example, the location estimate may allow a node 124 of the IMS core network 104 to route a call from the mobile device 102 to an appropriate receiver endpoint as part of location-based short code routing (SCR). For example, the mobile device 102 may transmit the message 116 as part of initiating a call to a short code (x11), and the estimated location of the mobile device 102 may be used to determine the "long number" to which the short code is to be translated so that the appropriate receiver endpoint is contacted. Other downstream operations include determining how much to charge the subscriber 114 (i.e., a billing rate) based on where the mobile device 102 is located (e.g., what country), authorizing access to a service, such as a multimedia telephony service like Wi-Fi calling, or providing the estimated location to an authorized third party at the consent of the user 114 (e.g., a family member).

Figure 3:
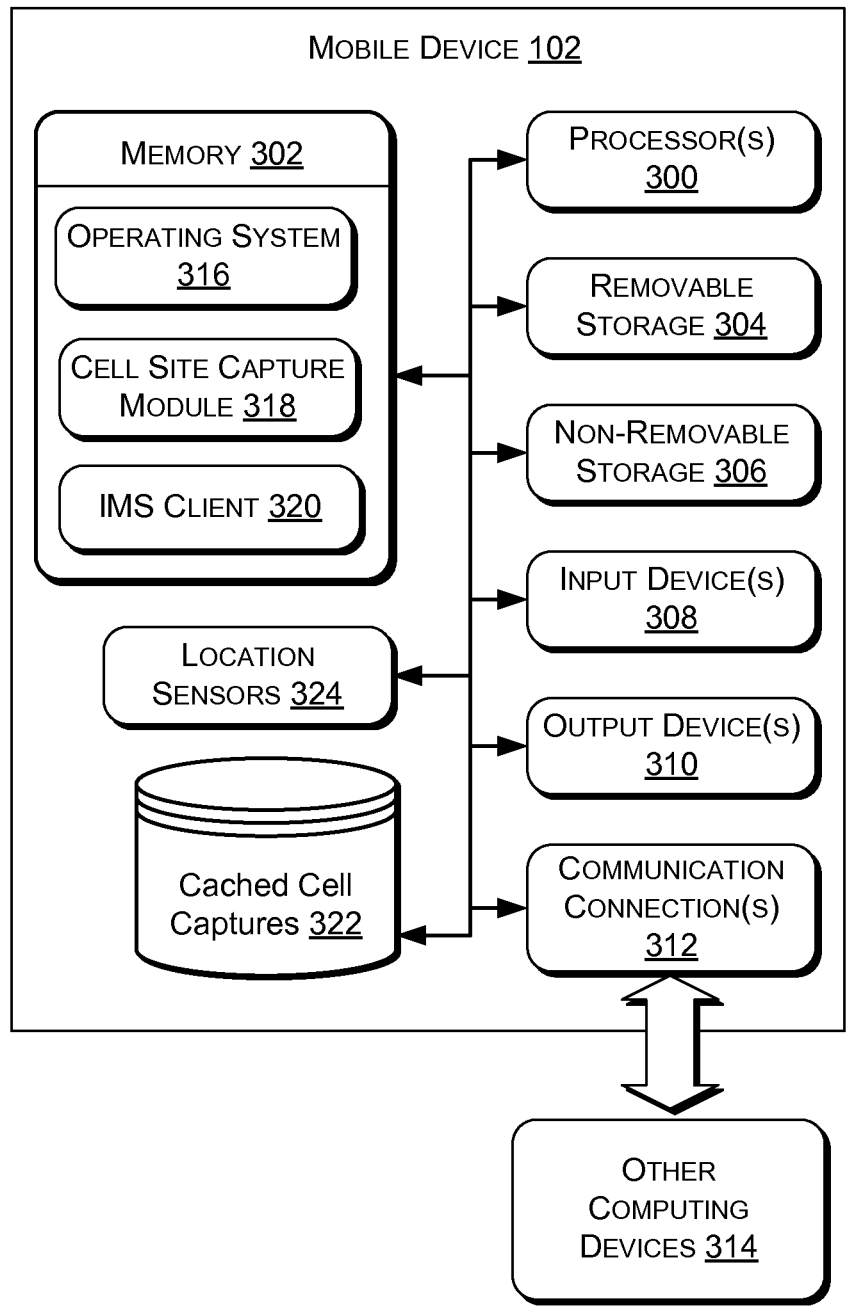
FIG. 3 is a block diagram of an example mobile device architecture in accordance with various embodiments.

FIG. 3 is a block diagram of an example architecture of a mobile device 102 in accordance with various embodiments. As shown, the mobile device 102 may include one or more processors 300 and one or more forms of computer-readable memory 302. The mobile device 102 may also include additional storage devices. Such additional storage may include removable storage 304 and/or non-removable storage 306.

The mobile device 102 may further include input devices 308, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user, pointing devices (e.g., mouse, pen, stylus, etc.), or any other suitable input devices 308 coupled communicatively to the processor(s) 300 and the computer-readable memory 302. The mobile device 102 may further include output devices 310, including, without limitation, a display, speakers, a printer, or any other suitable output device coupled communicatively to the processor(s) 300 and the computer-readable memory 302.

The mobile device 102 may further include communications connection(s) 312 that allow the mobile device 102 to communicate with other computing devices 314 such as via a network. The communications connection(s) 312 may facilitate transmitting and receiving wireless signals over any suitable wireless communications/data technology, standard, or protocol, as described above, such as using licensed, semi-licensed, or unlicensed spectrum over a telecommunications network. For example, the communication connection(s) 312 may represent one or more of a cellular radio, a wireless (e.g., IEEE 802.1x-based) interface, a Bluetooth® interface, and so on.

In various embodiments, the computer-readable memory 302 generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 302 may also be described as computer storage media and may include volatile and nonvolatile, removable and non-removable media implemented in any method or technology for storage of information, such as computer readable instructions, data structures, program modules, or other data. Computer-readable memory 302, removable storage 304 and non-removable storage 306 are all examples of computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the mobile device 102. Any such computer-readable storage media may be part of the mobile device 102.

In some embodiments, the computer-readable memory 302 may include an operating system 316, a cell site capture module 318, and an IMS client 320, among other possible modules, data structures, and/or processor-readable instructions. The cell site capture module 318 may be configured to obtain cell captures 120 of cell sites within communications range of the mobile device 102 via the communications connections 312 (e.g., a cellular radio). In this manner, the mobile device 102 is configured to obtain a plurality of cell captures 120 at multiple different times (e.g., periodically), and the obtained cell captures 120 may be stored in cache (or other suitable memory) as cached cell captures 322. The cached cell captures 322 may be associated with a cell-timestamp 208, as described in FIG. 2.

The IMS client 320 may be configured to generate and transmit the messages 116, such as SIP requests, discussed with referenced to FIGS. 1 and 2, as well as interpret responses (e.g., SIP responses) from nodes 124 of the IMS core network 104. For example, the IMS client 320 may be configured to insert one or more location IDs, such as the location ID 118 and/or the location ID 216, into a message 116 before transmission via the communication connection(s) 312, such as over an untrusted RAN 108. Accordingly, FIG. 3 also shows that the mobile device 102 may include one or more location sensors 324 that are configured to determine an approximate current location of the mobile device 102 for purposes of generating the location ID 216. For example, the location sensor(s) 324 may include a GPS receiver, or any other suitable hardware sensor to facilitate location estimation, perhaps in conjunction with other processor-executable instructions, data structures, and/or program modules stored in the memory 302.

Figure 4:
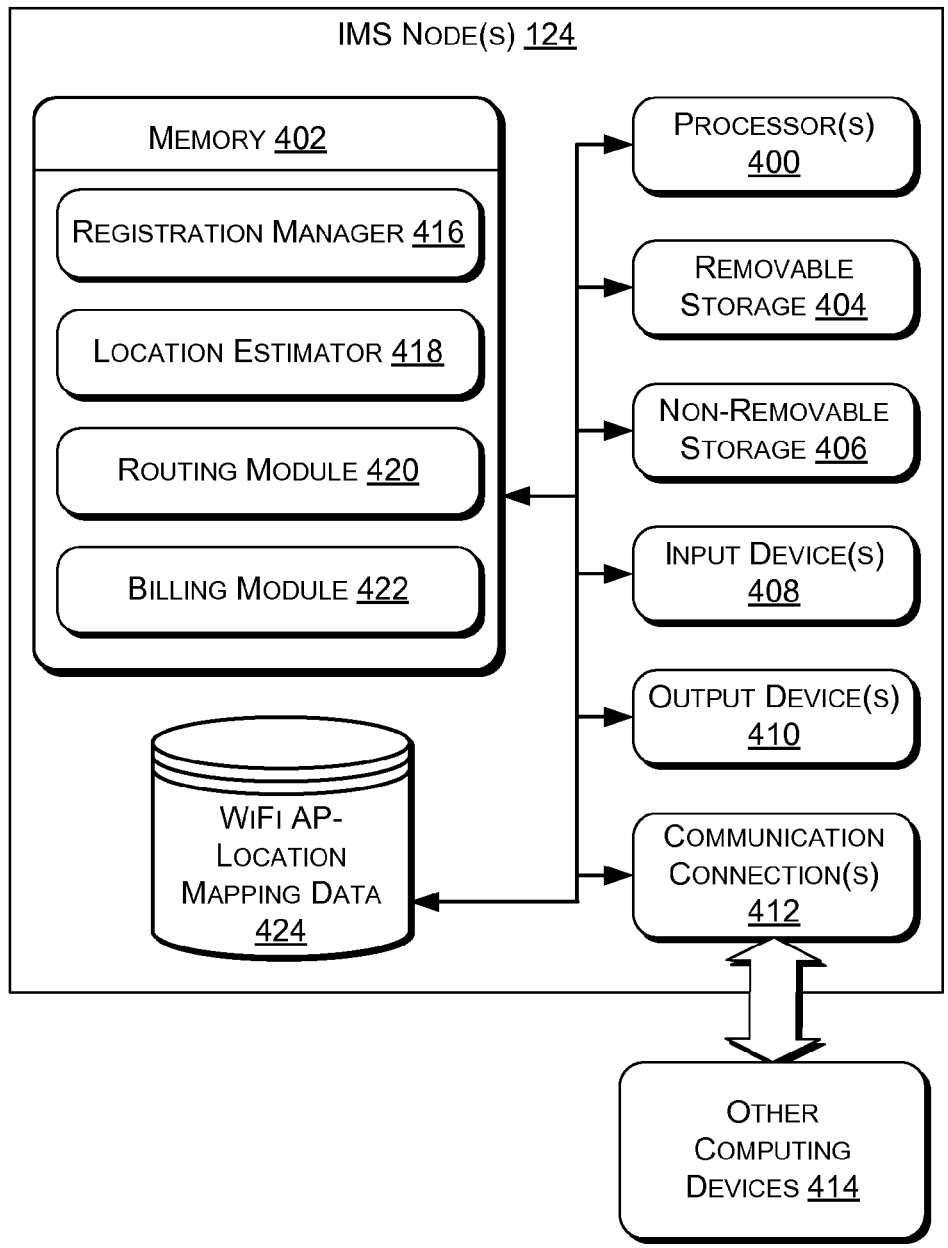
FIG. 4 is a block diagram of an example IMS node(s) architecture in accordance with various embodiments.

FIG. 4 is a block diagram of an example architecture of an IMS node(s) 124 in accordance with various embodiments. As shown, the IMS node(s) 124 may include one or more processors 400 and one or more forms of computer-readable memory 402. The IMS node(s) 124 may also include additional storage devices. Such additional storage may include removable storage 404 and/or non-removable storage 406.

The IMS node(s) 124 may further include input devices 408 and output devices 410 communicatively to the processor(s) 400 and the computer-readable memory 402. The IMS node(s) 124 may further include communications connection(s) 412 that allow the IMS node(s) 124 to communicate with other computing devices 414 such as via a network. The communications connection(s) 412 may facilitate transmitting and receiving wired and/or wireless signals over any suitable communications/data technology, standard, or protocol, as described herein. The computer-readable memory 402 may include any of the forms of memory described above with respect to the memory and computer-readable storage media of FIG. 3.

In some embodiments, the computer-readable memory 402 may include a registration manager 416, a location estimator 418, a routing module 420, and a billing module 422, among other possible modules, data structures, and/or processor-readable instructions. The registration manager 416 may be configured to manage registration messages from mobile devices 102 for registering with one or more IMS-based services of the IMS core network 104. For example, the registration manger 416 may receive registration requests (e.g., SIP REGISTER methods) from the mobile devices 102, and may forward the message 116, or information therein, to an appropriate component, such as the location estimator 418, the routing module 420, and/or the billing module 422, as needed, which may reside on the same IMS node 124 or a different IMS node 124. The registration manager 416 may further grant or deny access to IMS-based services based on information in the message 116. For example, if the age of the location ID 118 in the message 116 is above a threshold age (e.g., more than 2 hours old), the registration manager 416 may deny access to one or more IMS-based services to the mobile device 102 due to the fact that a reasonable current location estimate cannot be ascertained. This may occur, for example, when the mobile device 108 has been out of cellular coverage for a significant amount of time and cannot ascertain its own location for whatever reason upon registering for an IMS-based service.

The location estimator 418 may be configured to estimate a current location of a mobile device 102 that sent a message 116 received by the registration manager 416. The location estimator 418 may use the location ID 118 and/or the location ID 216 included in the message 116 and one or more predefined rules to estimate the location, as described with reference to the diagram of FIG. 2 (e.g., a point location and surrounding shape location estimate). For example, using a rule that a user 114 is predicted to travel at a certain speed (or is predicted to cover a certain amount of distance in a given unit of time), the location estimator 418 may determine the length of the radius, R1, shown in FIG. 2, based on an age of the location ID 118 included in the message 116.

In instances where the location ID 118 is included in the message header 204 and the location ID 216 is also included in the message body 206, the location estimator 418 may defer/default to using one or the other of the location ID 118 or the location ID 216 to estimate location using a preferred location ID. In other embodiments, the location estimator 418 may determine a first location estimate based on the location ID 118 in the header 204, and may also determine a second location estimate based on the location ID 216 in the message body 206, and may then compare the two (i.e., first and second) location estimates to determine how similar or different the two location estimates are. The location estimator 418 may have a higher confidence in a location estimate where the two (i.e., first and second) location estimates are very similar, in which case, the location estimator 418 may decide to estimate the location as a location somewhere between (e.g., halfway of the distance between) the two location estimates. If, on the other hand, the two location estimates are significantly different, the location estimator 418 may deduce that at least one of the location estimates is wrong, and may defer to one or the other location estimate that is statistically more reliable than the other.

In some embodiments, the location estimates determined by the location estimator 418 may be correlated to components of an untrusted RAN 108 that the message 116 was sent through before being received at the node 124 of the IMS core 104. For example, the message 116 may include a MAC address of the Wi-Fi AP 200 of the untrusted RAN 108 through which the message 116 was sent. With this information, the location estimator 418 may correlate its estimate of the current location of the mobile device 102 to the MAC address of the Wi-Fi AP 200, and may cause this data to be stored as Wi-Fi AP location mapping data 424. Thus, as more messages 116 are received from additional mobile devices 116 that transmit the messages 116 through the same Wi-Fi AP 200, the IMS node(s) 124 may start to get a better idea of where a Wi-Fi AP 200 is located. That is, as more and more messages 116 are received, the Wi-Fi AP location mapping data 424 will have a plurality of location estimates associated with a given Wi-Fi AP 200, and this data can be analyzed to determine a location estimate of the Wi-Fi AP 200. In this manner, the locations of untrusted RAN 108 equipment may be learned over time to develop a mapping of untrusted RAN 108 infrastructure that may be useful to components of the IMS core network 104.

The routing module 420 may be configured to route traffic (e.g., calls, SIP requests, etc.) initiated by mobile devices 102 to an appropriate receiver endpoint based on the location estimated by the location estimator 418. For example, some calls, such as short codes or x11 dialing (e.g., 211, 411, 911, etc.), are to be location-based routed to a "long number" associated with an appropriate receiver endpoint location. In the 911 emergency context, the IMS node 124 may have access to a specified "home/911 location" of the subscriber 114, and can therefore use the location estimate from the location estimator 418 to determine whether the subscriber 114 is at his/her home location. If the subscriber 114 is within a threshold distance from his/her home location, the routing module 420 may defer to the home location as a location estimate because the home location may be the best possible location to send public safety for dispatch. If, on the other hand, the subscriber 114 is beyond a threshold distance from his/her home location, the location estimate from the location estimator 418 may be used for emergency dispatch, and/or a hierarchical list of possible locations may be traversed to determine where the subscriber 114 is located. The routing module 420 may, in some instances, route the location estimate from the location estimator 418 to authorized third parties, such as a family member, upon receipt of the consent of the subscriber 114 to do so.

The billing module 422 may be configured to determine a billing rate (i.e., how much to charge a subscriber 114 per unit time that the IMS-based service is used) for the subscriber based on the current location estimated by the location estimator 418. As rates for calling (e.g., mobile telephony service rates) may vary by location (e.g., roaming networks, etc.), the location estimate from the location estimator 418 may facilitate appropriate billing for the subscriber's use of IMS-based services over untrusted RANs 108. In some embodiments, the billing module 422 facilitates the creation of accurate call detailed records (CDRs). Time zones can be derived from location, and may be used for rating purposes by the billing module 422.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 5:
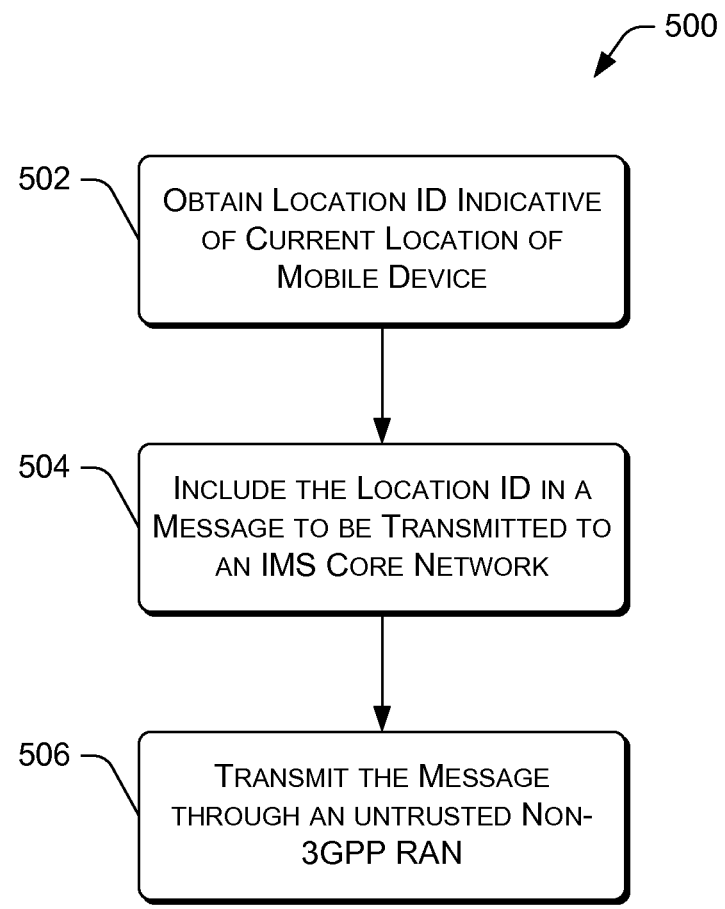
FIG. 5 illustrates a flowchart of an example process for generating and transmitting a message from a mobile device to an IMS core network such that the message includes a location ID that is indicative of a current location of the mobile device.

FIG. 5 illustrates a flowchart of an example process 500 for generating and transmitting a message 116 from a mobile device 102 to an IMS core network 104 such that the message 116 includes a location ID that is indicative of a current location of the mobile device 102. The process 500 may be implemented by a mobile device 102 and relevant components of the mobile device 102, such as the IMS client 320.

At 502, a mobile device 102 may obtain a location identifier (ID) that is indicative of the current location of the mobile device 102. For example, the mobile device 102 may utilize a cellular radio interface to determine a cell site within communication range of the mobile device 102, and/or the mobile device 102 may utilize a location sensor 324 (e.g., a GPS receiver), a client application, or a combination thereof, to approximate the current location of the mobile device 102 at 502.

At 504, the IMS client 320 of the mobile device 102 may generate a message 116 by including the location ID obtained at 502 within the message 116. As shown in FIG. 2, this may include inserting the location ID 118 (e.g., a CID of a closest cell site 202) in the message header 204 and/or inserting the location ID 216 in the message body 206. In some embodiments, the message 116 generated at 504 comprises a SIP request (e.g., a SIP REGISTER method).

At 506, the message 116 may be transmitted by the mobile device 102 to a node 124 of an IMS core network 104 through an untrusted non-3GPP RAN 108. For example, the message 116 may be transmitted at 506 through an untrusted Wi-Fi RAN 108, such as when the mobile device 102 is trying to register for Wi-Fi calling services. The process 500 allows a mobile device 102 to transmit a message 116 with a location ID (i.e., the location ID 118 and/or the location ID 216) so that a current location of the mobile device 102 can be ascertained by a node 124 of the IMS core network 104.

Figure 6:
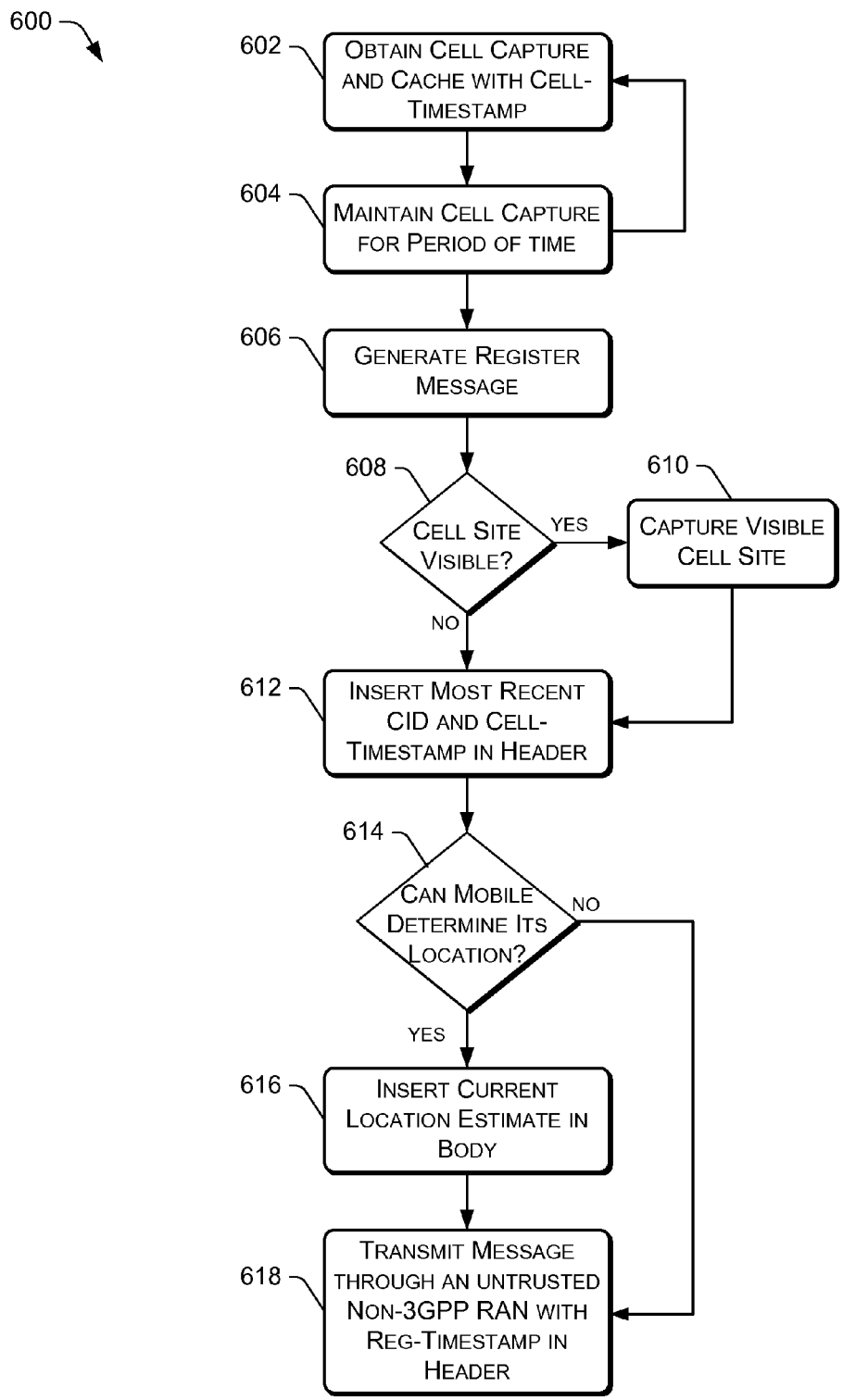
FIG. 6 illustrates a flowchart of a more detailed example process for generating and transmitting a message from a mobile device to an IMS core network such that the message includes a location ID that is indicative of a current location of the mobile device.

FIG. 6 illustrates a flowchart of a more detailed example process 600 for generating and transmitting a message 116 from a mobile device 102 to an IMS core network 104 such that the message 116 includes a location ID that is indicative of a current location of the mobile device 102. The process 600 may be implemented by a mobile device 102 and relevant components of the mobile device 102, such as the IMS client 320.

At 602, the mobile device 102 may obtain and cache a cell capture 120 in association with a cell-timestamp 208 indicating a time when the CID was obtained. The cell capture 120 may include at least a CID of a cell site in communication range of the mobile device 102, as described above, such as the nearest cell site 202.

At 604, the mobile device 102 maintains the cell capture for a period of time, such as by monitoring a clock or a timer. In one example, the mobile device 102 may expire cell captures after a period of a few hours (e.g., 2 hours). Steps 602 and 604 may iterate over time and as the mobile device 102 moves about an area such that a list of cell captures 120 visible to the mobile device 102 may be obtained over time.

At 606, the IMS client 320 of the mobile device 102 may generate a message 116 that is to be sent to a node 124 of an IMS core network 104 as part of a registration for an IMS-based service (e.g., a SIP REGISTER method). The message 116 generated at 606 could be another type of message, such as a SIP INVITE method, a SIP MESSAGE method, or any other suitable type of message 116.

At 608, a determination may be made as to whether a cell site is visible to (i.e., within cellular communication range of) the mobile device 102. If so, the cell site capture module 318 may capture the currently visible cell site (e.g., a nearest cell site to the mobile device 102). If a cell site is not currently visible (e.g., if the mobile device 102 does not currently have cellular coverage of a carrier's network), the IMS client 320 may insert, at 612, data (e.g., a CID) from the most recent cell capture 120 in cache and the associated cell-timestamp 208 in the message header 204. Alternatively, if there is a currently visible cell site at the time of message generation (i.e., "yes" path from 608) that was captured at 610, the most recent data inserted into the message header 204 at step 612 includes the data (e.g., CID) of the currently visible cell site, along with the cell-timestamp according to the cell capture at 610.

At 614, a determination may be made as to whether the mobile device 102 is able to ascertain its own location. For example, if a GPS receiver can obtain a current geodetic location (e.g., latitude and longitude coordinates), or if an application receives input from a user 114, or from crowd-sourcing means, the current location of the mobile device 102 may be approximated by the mobile device 102 and inserted into the message body 206 at step 616.

After insertion of the current mobile device 102 location into the message body at 616, or if a current location cannot be obtained at 614, the IMS client 320 transmits the message 116 at 618 with a reg-timestamp 210 included in the header 204 of the message 116, the message 116 being sent to a node 124 of an IMS core network 104 through an untrusted non-3GPP RAN 108 (e.g., a Wi-Fi RAN 108). The process 600 results in a message 116 being transmitted to the IMS core 104 from the mobile device 102 through an untrusted RAN 108, the message 116 including at least one location ID 118 in the message header 204, and, if possible, an additional location ID 216 in the message body 206.

Figure 7:
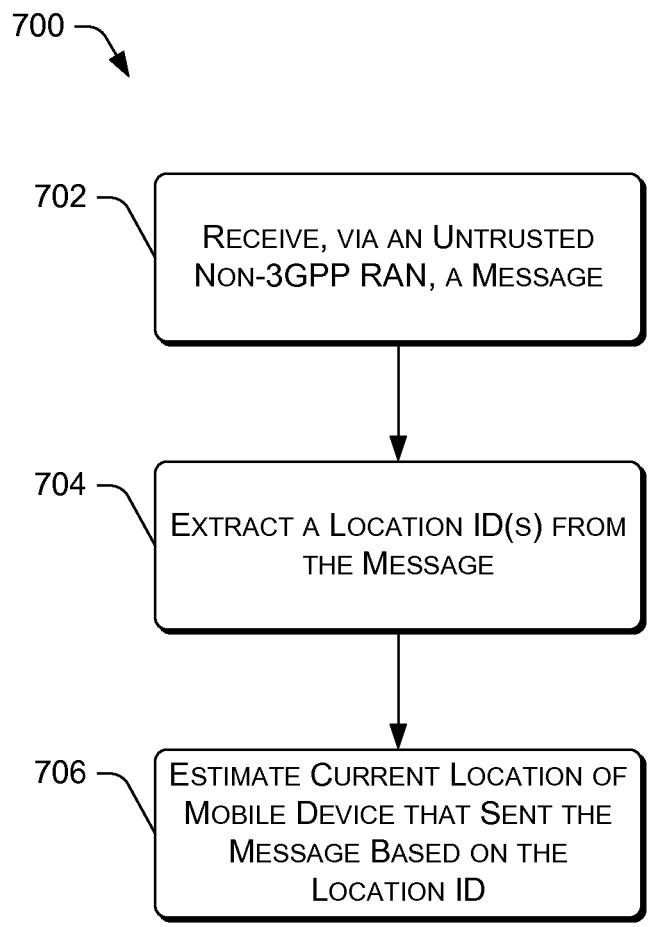
FIG. 7 illustrates a flowchart of an example process for estimating a current location of the mobile device based on a location ID of a message received from the mobile device.

FIG. 7 illustrates a flowchart of an example process 700 for estimating a current location of the mobile device 102 based on a location ID of a message 116 received from the mobile device 102. The process 700 may be implemented by one or more nodes 124 of the IMS core network 104 and relevant components of the IMS network 104, such as the location estimator 418.

At 702, a node 124 of the IMS core 104 may receive a message 116 from a mobile device 102 that was received through an untrusted non-3GPP RAN 108 (e.g., a Wi-Fi RAN 108).

At 704, one or more location IDs, such as the location ID 118 shown in the message header 204 of FIG. 2 and/or the location ID 216 shown in the message body 206 of FIG. 2, may be identified and extracted from the message 116.

At 706, the location estimator 418 may estimate the current location of the mobile device 102 that sent the message 116 based on the one or more location IDs extracted from the message 116. For example, as described above with respect to FIG. 2, a point location and a shape of a defined size that conveys the uncertainty in the point location estimate may be determined at 706. When the message 116 includes two location IDs (e.g., the location ID 118 in the header 204 and the location ID 216 in the body 206), the location estimator 418 may determine individual location estimates based on each location ID and may compare the two location estimates so that it may determine the accuracy of the location estimates and/or default to one or the other.

Figure 8:
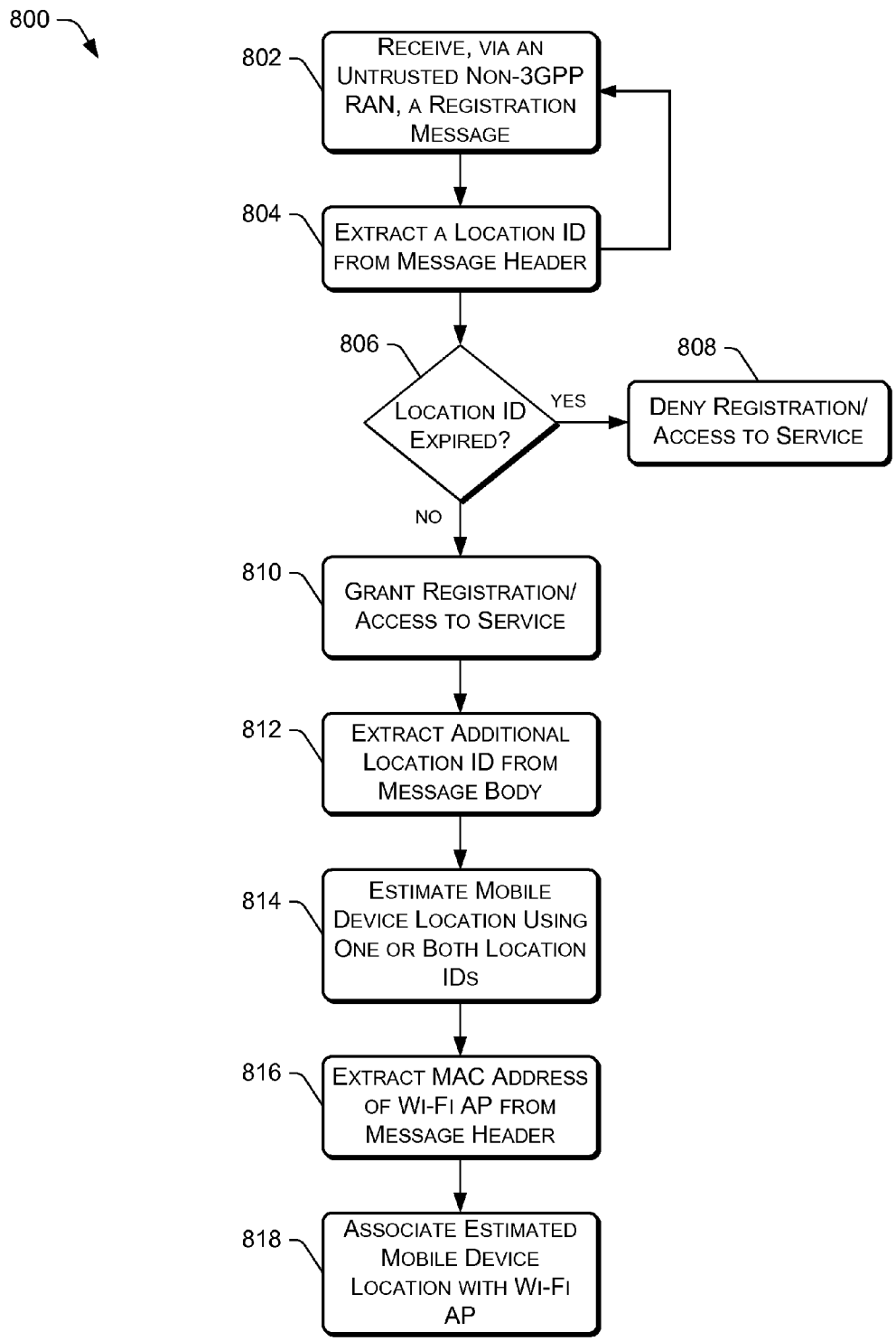
FIG. 8 illustrates a flowchart of a more detailed example process for estimating a current location of the mobile device based on a location ID of a message received from the mobile device, as well as granting or denying registration/access to an IMS-based service.

FIG. 8 illustrates a flowchart of a more detailed example process 800 for estimating a current location of the mobile device 102 based on a location ID of a message 116 received from the mobile device 102, as well as granting or denying registration/access to an IMS-based service. The process 800 may be implemented by one or more nodes 124 of the IMS core network 104 and relevant components of the IMS network 104, such as the location estimator 418.

At 802, a node 124 of the IMS core 104 may receive a registration message 116 from a mobile device 102 that was received through an untrusted non-3GPP RAN 108 (e.g., a Wi-Fi RAN 108). At 804, a location ID 118 may be extracted from the message header 204, such as a CID of a cell site.

At 806, it may be determined whether the location ID 118 is expired based on its age. For example, a difference between the reg-timestamp 210 and the cell-timestamp 208 may be calculated to determine the age of the location ID 118, and that age may be compared to a threshold age to determine whether the location ID 118 has expired. If the location ID 118 is expired (e.g., over 5 hours old), the registration manager 416 may deny, at 808, the registration request or otherwise deny access to a requested IMS-based service (e.g., a multimedia telephony service). This may be due to the fact that a current location of the mobile device 102 cannot be reasonably estimated from a location ID 118 that is expired (i.e., too old).

If, at 806, it is determined that the location ID 118 is not expired, the registration manager 416 may grant access to the IMS-based service at step 810, such as by approving the registration request. At 812, an additional location ID 216, if present, may be extracted from the message body 206.

At 814, the location estimator 418 may estimate the current location of the mobile device 102 that sent the message 116 based on the one or both of the location ID 118 extracted from the message header 204 or the location ID 216 extracted from the message body 206. For example, a default location ID of the two provided in the message may be chosen for estimating the location of the mobile device. Alternatively, individual location estimates may be made from each of the location IDs 118 and 216, and the location estimates compared in order to determine how close the location estimates are to each other. If they are within a threshold distance from each other, one or the other location estimates may be chosen, or a location estimate may be made that is based on both (e.g., halfway between the two estimates). If the two estimates are significantly different, a known, more reliable estimate may be chosen between the two, and the other thrown out.

At 816, a MAC address, or a similar identifier, of a Wi-Fi AP 200 that is associated with the untrusted RAN 108 may be extracted from the message header 204. At 818, the location estimator 418 may store the location estimated at 814 in association with the MAC address of the Wi-Fi AP 200 in order to learn where the Wi-Fi AP 200 may be located.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
   generating, by a communication device, a Session Initiation Protocol (SIP) request having:
   a location identifier (ID) that is indicative of a current location of the communication device, the location ID including at least a cell ID of a cell site within a trusted cellular radio access network that the communication device was previously connected to or is currently connected to;
   a first timestamp indicating a time when the cell ID was obtained; and
   a second timestamp indicating a time when the SIP request is to be transmitted to a node within an Internet Protocol Multimedia Subsystem (IMS) network,
   wherein the cell ID, first timestamp, and second timestamp are included in a private header (P-header) of the SIP request;
   transmitting the SIP request, by the communication device and through an untrusted WiFi radio access network, to the node within the IMS network; and
   receiving a grant or denial of access to an IMS multimedia telephony service over the untrusted WiFi radio access network based at least in part on the location ID.

2. The computer-implemented method of claim 1, further comprising, prior to generating the SIP request, obtaining the cell ID.

3. The computer-implemented method of claim 2, further comprising:
   caching the cell ID in association with the first timestamp; and
   maintaining the cached cell ID in memory of the communication device for a predetermined period of time.

4. The computer-implemented method of claim 1, further comprising, prior to generating the SIP request, determining the location of the communication device at a time when the SIP request is to be transmitted to the node within the IMS network, wherein the generating the SIP request further comprises including the determined location of the communication device in a body of the SIP request as at least one of the location ID or an additional location ID.

5. The computer-implemented method of claim 4, wherein the determining the location of the communication device comprises obtaining the location of the communication device from at least one of a global positioning system (GPS) receiver, crowdsourcing, or user entry of the location.

6. One or more non-transitory computer-readable media storing computer-executable instructions that, when executed, cause one or more processors of a communication device to perform acts comprising:
   generating a message having:
   a location identifier (ID) that is indicative of a current location of the communication device, the location ID including a location obtained using at least one of a global positioning system (GPS) receiver, crowdsourcing, or user entry of the location;
   a first timestamp indicating a time when the location ID was obtained; and
   a second timestamp indicating a time when the SIP request is to be transmitted to a node within an Internet Protocol Multimedia Subsystem (IMS) network,
   wherein the location ID, first timestamp, and second timestamp are included in a private header (P-header) of the message;
   transmitting the message, through an untrusted non-3GPP radio access network, to the node within the IMS network; and
   receiving a grant or denial of access to an IMS multimedia telephony service over the untrusted WiFi radio access network based at least in part on the location ID.

7. The one or more non-transitory computer-readable media of claim 6, wherein the message comprises a Session Initiation Protocol (SIP) request that is transmitted in order to access the IMS multimedia telephony service via the untrusted non-3GPP radio access network.

8. The one or more non-transitory computer-readable media of claim 6, wherein the untrusted non-3GPP radio access network comprises an untrusted WiFi radio access network.

9. The one or more non-transitory computer-readable media of claim 6, the acts further comprising, prior to generating the message, obtaining a cell ID of a cell site within a trusted cellular radio access network and within cellular communication range of the communication device, wherein the generating the message comprises including the cell ID as part of the location ID in the private header of the message.

10. The one or more non-transitory computer-readable media of claim 9, wherein the message comprises a Session Initiation Protocol (SIP) request.

11. The one or more non-transitory computer-readable media of claim 9, the acts further comprising:

caching the cell ID in association with the first timestamp; and maintaining the cached cell ID in memory of the communication device for a predetermined period of time.

12. The one or more non-transitory computer-readable media of claim 6, the acts further comprising, prior to generating the message, determining the location of the communication device at a time when the message is to be transmitted to the node within the IMS network, wherein the generating the message comprises including the determined location of the communication device in a body of the message as at least one of the location ID or an additional location ID.

13. A system within an Internet Protocol Multimedia Subsystem (IMS) network, the system comprising:

one or more processors;

one or more memories storing instructions that, when executed by the one or more processors, perform acts comprising:

receiving, from a communication device and via an untrusted non-3GPP radio access network, a message having a location identifier (ID), a first timestamp indicating a time when the location ID was obtained by the communication device, and a second timestamp indicating a time when the message was transmitted by the communication device, wherein the location ID, first timestamp, and second timestamp are included in a private header of the message;

in response to receiving the message, estimating a current location of the communication device based at least in part on the location ID; and granting or denying access to an IMS multimedia telephony service via the untrusted non-3GPP radio access network, the granting or denying being based at least in part on a time elapsed since the first timestamp.

14. The system of claim 13, wherein the estimating the location comprises:

calculating a difference between the first timestamp and the second timestamp; and estimating the current location of the communication device in terms of a circle around a point location specified in the location ID, wherein a radius of the circle is based at least in part on the calculated difference.

15. The system of claim 13, wherein the estimating the location comprises:

extracting the location ID from the message; and estimating the current location of the communication device in terms of a circle around a point location specified in the location ID, wherein a radius of the circle is based at least in part on a level of uncertainty of the point location corresponding to an actual location of the communication device.

16. The system of claim 13, the acts further comprising:

extracting from the message a device ID of a WiFi access point of the untrusted non-3GPP radio access network; and associating the current location of the communication device with the device ID of the WiFi access point.

17. The system of claim 13, the acts further comprising:

extracting the location ID from the private header of the message;

extracting an additional location ID from a body of the message; and calculating a distance between respective locations of the location ID and the additional location ID, wherein the estimating the current location of the communication device comprises estimating a location between the respective locations.

18. The system of claim 13, the acts further comprising at least one of:

routing a call initiated by the communication device to a receiver endpoint based at least in part on the current location;

determining a billing rate for a call initiated by the communication device, the billing rate being based at least in part on the current location;

granting or denying access to the IMS multimedia telephony service, the granting or denying being based at least in part on the current location; or forwarding the current location to an authorized third party.

* * * * *